US010575468B2

(12) United States Patent
Flickinger

(10) Patent No.: US 10,575,468 B2
(45) Date of Patent: Mar. 3, 2020

(54) APPARATUS FOR SETTING CONCAVE CLEARANCE AND PINCH POINT IN A COMBINE HARVESTER

(71) Applicant: CNH Industrial America LLC, New Holland, PA (US)

(72) Inventor: Wayne Flickinger, Oxford, PA (US)

(73) Assignee: CNH Industrial America LLC, New Holland, PA (US)

( * ) Notice: Subject to any disclaimer, the term of this patent is extended or adjusted under 35 U.S.C. 154(b) by 176 days.

(21) Appl. No.: 15/815,835

(22) Filed: Nov. 17, 2017

(65) Prior Publication Data
US 2019/0150366 A1    May 23, 2019

(51) Int. Cl.
*A01F 12/28*      (2006.01)
*A01F 7/02*       (2006.01)
*A01F 12/18*      (2006.01)

(52) U.S. Cl.
CPC ............... *A01F 12/28* (2013.01); *A01F 7/02* (2013.01); *A01F 12/181* (2013.01)

(58) Field of Classification Search
CPC .......... A10F 12/28; A10F 12/26; A10F 12/24; A10F 7/06; A10F 12/181; A10F 7/062; A10F 12/185; A10F 7/02; A10F 12/18; A01D 75/182
See application file for complete search history.

(56) References Cited

U.S. PATENT DOCUMENTS

| 1,095,693 A | * | 5/1914 | Anderson | A01F 12/28 460/109 |
| 2,616,433 A | * | 11/1952 | Anderson | A01F 12/28 241/88.4 |
| 4,330,000 A | * | 5/1982 | Peiler | A01F 12/28 460/109 |
| 4,774,968 A | * | 10/1988 | Spanlang | A01F 12/24 460/109 |

(Continued)

FOREIGN PATENT DOCUMENTS

| DE | 4218611 A1 | 12/1993 |
| DE | 4321272 C1 | 1/1995 |

(Continued)

OTHER PUBLICATIONS

Extended European Search Report for EP Application No. 18203248.2 dated Feb. 22, 2019 (six pages).

*Primary Examiner* — Arpad Fabian-Kovacs
(74) *Attorney, Agent, or Firm* — Peter K. Zacharias; Patrick M. Sheldrake

(57) ABSTRACT

A concave adjustment device for an agricultural harvester includes a rotor having a longitudinal axis, a concave encircling at least a portion of the rotor, and a linkage connected to the concave for moving the concave with respect to the rotor. The linkage includes a first link, a second link and the concave. The first link has a first portion connected to a device for moving the linkage and a second portion connected to one side of the concave. The second (Continued)

link has a first portion pivotably connected to an opposing side of the concave and a second portion pivotably connected to a fixed point on the harvester. The device for moving the linkage is configured to translate the first link, which causes rotation of the second link and movement of the concave with respect to the rotor.

19 Claims, 5 Drawing Sheets

(56) References Cited

U.S. PATENT DOCUMENTS

| | | | |
|---|---|---|---|
| 5,395,287 A | 3/1995 | Coers | |
| 5,489,239 A * | 2/1996 | Matousek | A01F 12/28 460/109 |
| 6,358,142 B1 * | 3/2002 | Imel | A01F 12/26 460/107 |
| 6,758,745 B2 * | 7/2004 | Van Der Haegen | A01F 12/24 460/104 |
| 6,958,012 B2 | 10/2005 | Duquesne et al. | |
| 7,393,274 B2 | 7/2008 | Voss et al. | |
| 7,520,806 B2 * | 4/2009 | Bundy | A01D 41/1274 460/6 |
| 7,803,040 B1 | 9/2010 | Flickinger et al. | |
| 8,133,101 B2 | 3/2012 | Regier et al. | |
| 2005/0176483 A1 * | 8/2005 | Schenk | A01F 12/28 460/106 |
| 2005/0176484 A1 * | 8/2005 | Schenk | A01F 12/28 460/109 |
| 2007/0178951 A1 * | 8/2007 | Voss | A01F 12/28 460/109 |
| 2011/0151951 A1 * | 6/2011 | Regier | A01F 12/181 460/109 |
| 2014/0308998 A1 * | 10/2014 | Bergkamp | A01F 12/28 460/107 |
| 2016/0316631 A1 * | 11/2016 | Davenport, III | A01F 12/26 |
| 2017/0013781 A1 | 1/2017 | Flickinger et al. | |
| 2017/0105351 A1 * | 4/2017 | Matway | A01F 12/185 |
| 2017/0164559 A1 * | 6/2017 | Matousek | A01F 7/062 |
| 2017/0339832 A1 * | 11/2017 | Matousek | A01F 12/26 |
| 2019/0159403 A1 * | 5/2019 | Haar | A01F 12/28 |

FOREIGN PATENT DOCUMENTS

| | | |
|---|---|---|
| FR | 2514228 A1 | 4/1983 |
| GB | 2065437 A | 7/1981 |
| WO | 2013082236 A1 | 6/2013 |

* cited by examiner

APPARATUS FOR SETTING CONCAVE CLEARANCE AND PINCH POINT IN A COMBINE HARVESTER

FIELD OF THE INVENTION

The present invention pertains to an agricultural combine harvester and, more specifically, to a threshing system of a combine, and more specifically, to a device for setting clearance between a concave and a rotor of the combine harvester.

BACKGROUND OF THE INVENTION

As described in U.S. Patent Application Publ. No. 20170013781 to Flickinger, which is incorporated by reference herein in its entirety and for all purposes, an agricultural harvester known as a "combine" is historically termed such because it combines multiple harvesting functions with a single harvesting unit, such as picking, threshing, separating and cleaning. A combine includes a header, which removes the crop from a field, and a feeder housing which transports the crop matter into a rotary threshing and separating system. Conventional components of a combine harvester are shown in that patent application publication.

The rotary threshing and separating system includes one or more rotors which extend axially (front to rear) or transversely within the body of the combine, and which is partially or fully surrounded by a perforated concave. The crop material is threshed and separated by the rotation of the rotor within the concave.

As is described in U.S. Pat. No. 8,133,101, which is also incorporated by reference herein in its entirety and for all purposes, because combine harvesters are utilized to harvest a wide variety of different crops and must function properly in many different operating conditions, it is important to be able to conveniently and accurately adjust the running clearance in the region between the one or more rotors and concave to best accommodate these variables. U.S. Pat. No. 8,133,101 describes one device for adjusting the clearance between the rotors and the concave.

Many concaves are pivotable about a single pivot point to adjust the clearance between the rotors and the concave. As combine capacity has grown, so has concave wrap (i.e., the arc measure of the concave about the rotor). The concave wrap shown in FIGS. 2A-2D is about 180 degrees, for example. The increase in concave wrap coupled with the limited ability of the aforementioned concaves to pivot about a single fixed pivot point has resulted in an inconsistent concave clearance profile as the clearance between the rotors and the concave is adjusted for various crops. Such geometry forces a larger change in clearance at the bottom of the concave relative to the sides of the concave, which forces the shape profile away from the traditional wedge profile that is desirable in the art.

Improvements in devices for adjusting the clearance between the concave and the rotor are continuously sought in the interest of improving crop processing efficiency.

SUMMARY OF THE INVENTION

According to one aspect of the invention, a concave adjustment device for an agricultural harvester includes a rotor having a longitudinal axis, a concave encircling at least a portion of the rotor, and a linkage connected to the concave for moving the concave with respect to the rotor. The linkage includes a first link, a second link and the concave. The first link has a first portion connected to a device for moving the linkage and a second portion connected to one side of the concave. The second link has a first portion pivotably connected to an opposing side of the concave and a second portion pivotably connected to a fixed point on the harvester. The device for moving the linkage is configured to translate the first link, which causes rotation of the second link and movement of the concave with respect to the rotor.

BRIEF DESCRIPTION OF THE DRAWINGS

For the purpose of illustration, there are shown in the drawings certain embodiments of the present invention. It should be understood, however, that the invention is not limited to the precise components, arrangements, dimensions, and instruments shown. Like numerals indicate like elements throughout the drawings. In the drawings.

DETAILED DESCRIPTION OF THE INVENTION

Various terms are used throughout the disclosure to describe the physical shape or arrangement of features. A number of these terms are used to describe features on rotors and cages that either have, or conform to, a cylindrical or generally cylindrical geometry characterized by a radius and a center axis perpendicular to the radius. Unless a different meaning is specified, the terms are given the following meanings. The terms "longitudinal", "longitudinally", "axial" and "axially" refer to a direction, dimension or orientation that is parallel to the center axis A. The terms "radial" and "radially" refer to a direction, dimension or orientation that is perpendicular to the axis A. The terms "inward" and "inwardly" refer to a direction, dimension or orientation that extends in a radial direction toward the axis A. The terms "outward" and "outwardly" refer to a direction, dimension or orientation that extends in a radial direction away from the axis A.

Figure 1:
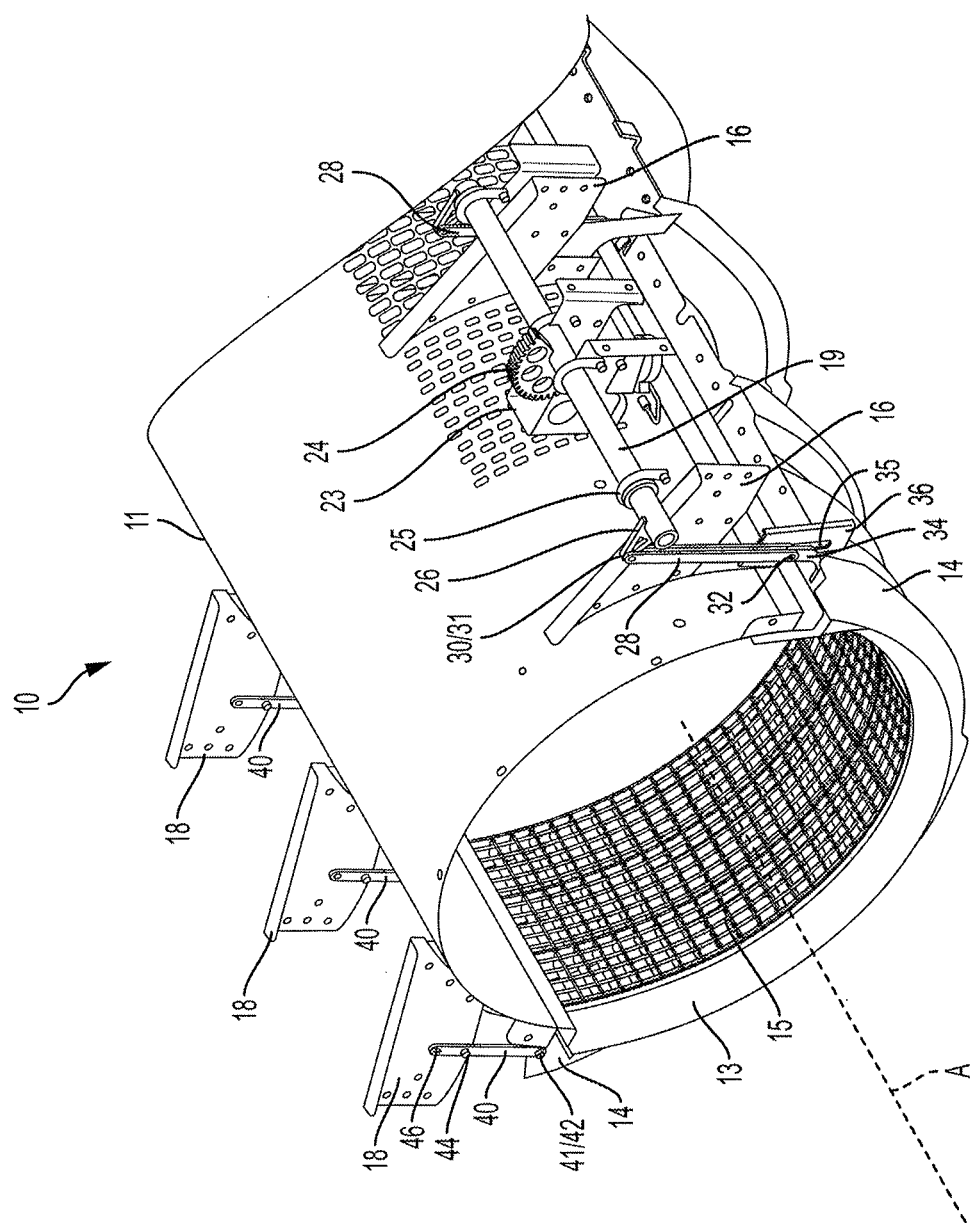
FIG. 1 illustrates an isometric view of a simplified threshing system.
Figure 2A:
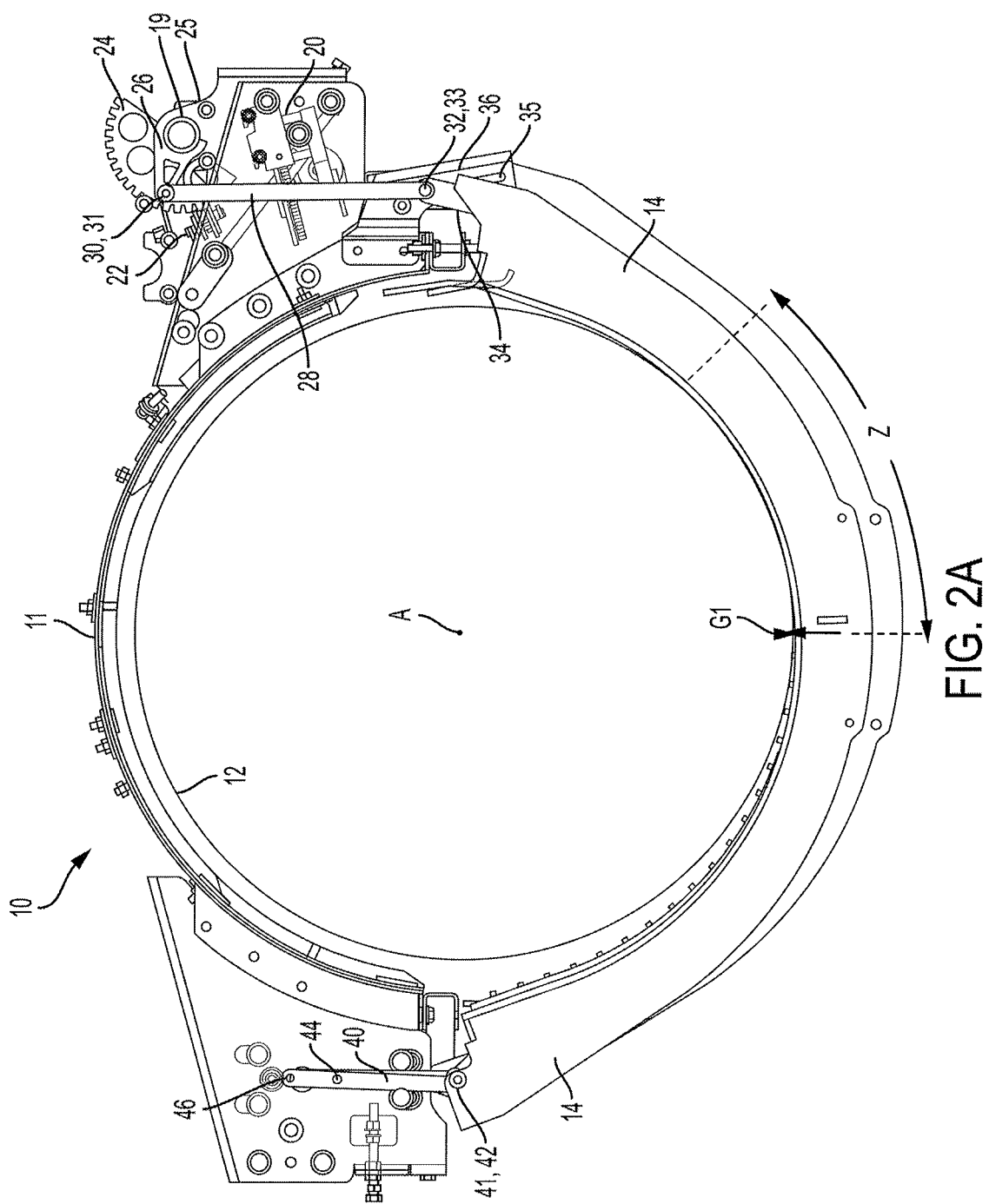
FIGS. 2A-2D depict a front elevation view of the simplified threshing system of FIG. 1, wherein those figures depict the concave of the threshing system moving in a sequential fashion from a closed position (FIG. 2A) to an open position (FIG. 2D).
Figure 2B:
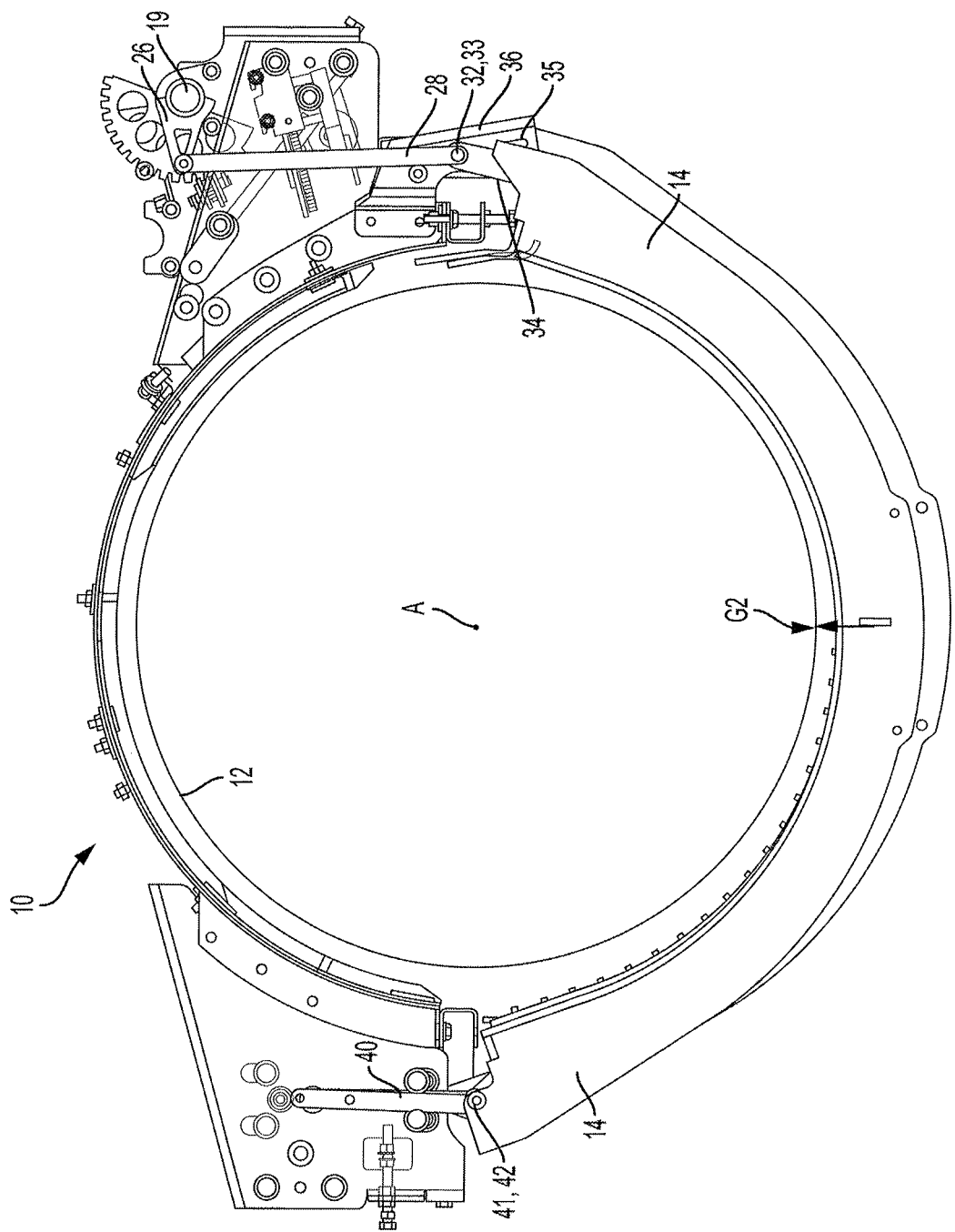
Figure 2C:
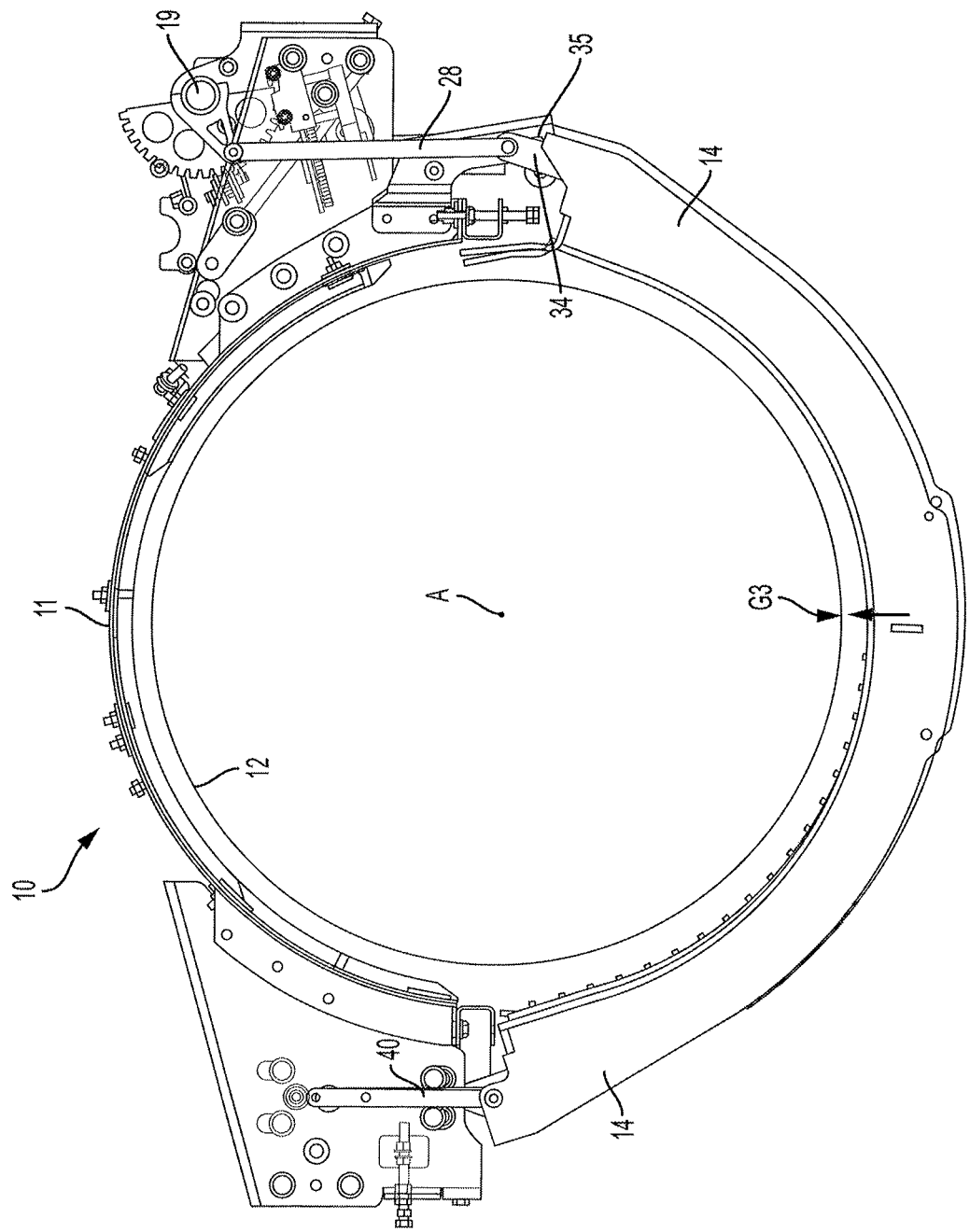

Referring now to the instant invention shown in FIGS. 1 and 2A, a simplified threshing system 10 is shown. The simplified threshing system 10 (referred to as system 10, hereinafter) comprises a cylindrical housing generally comprising a rotor cage 11 mounted above concaves 14. A rotor 12, which has a longitudinal axis of rotation 'A,' is positioned within the hollow interior of the housing. The rotor 12 is shown schematically in FIGS. 2A-2D.

The concaves 14, which may be referred to in the art as foraminous processing members, are positioned beneath the rotor 12. Each concave 14 wraps around a portion of the bottom of the rotor 12 in a circumferential direction. Each concave 14 has a cradle-like frame having a series of arcuate, elongated and laterally spaced apart side rails 13, and a grate 15 mounted to the side rails 13. In operation of the combine harvester, threshed grain passes through the grate 15. Unlike various concaves of the prior art, portions of the concave 14 cannot pivot with respect to each other.

A series of hangers 16 and 18 are mounted to the exterior surface of the rotor cage 11 for supporting, among other things, a concave adjustment device. Hangers 16 and 18 may be referred to as support brackets.

The concave adjustment device generally comprises a rock shaft 19 that is configured to be rocked, i.e., rotated, in two different rotational directions by a means for rotating the rock shaft 19. According to this embodiment, the means for rotating the rock shaft 19 comprises a motor 20 having an output shaft that rotates a worm (i.e., screw) 22, which rotates a gear 24 by way of toothed engagement. It should be understood that the worm 22 and the gear 24 constitute a worm-gear arrangement. The gear 24 is fixedly connected (e.g., keyed or fastened) to the rock shaft 19 such that rotation of the gear 24 results in rotation of the rock shaft 19. The motor 20 and the worm 22 are mounted to a bracket 23 that is fixed to the rotor cage 11.

It should be understood that the means for rotating the rock shaft 19 may vary from that which is shown and described. For example, the means could include a belt drive, chain drive, or a clutch. The means could have any known gear arrangement. The output shaft of the motor 20 could be directly connected to the rock shaft 19, thereby foregoing the gear arrangement in its entirety. The means may not include the motor 20, and could instead be powered by a shaft, belt or chain that is powered by a different motor of the combine harvester. As yet another alternative, the means may be manually operated, such as in the form of a manually operated lever.

Bearings 25 for the rock shaft 19, which are positioned along the length of the rock shaft 19, may be mounted to the bracket 23 and/or the hangers 16. One or more brackets 26 are also fixedly connected (e.g., keyed or fastened) to the rock shaft 19 such that rotation of the gear 24 results in rotation of the rock shaft 19 and the bracket 26. According to this embodiment, at least two brackets 26 are fixedly connected to the rock shaft 19.

Referring still to the features of the concave adjustment device, each bracket 26 is connected to a respective first link 28 in the form of an extended rod or plate. One end 30 of the link 28 is pinned to the bracket 26 by a pin 31 such that the end 30 is rotatable about the pin 31. The opposite end 32 of the first link 28 is pinned to a bracket 34 by a pin 33 such that the bracket 34 is rotatable about the pin 33. The bracket 34 is fixed to one end of the concave 14. The pin 33, or a device extending from the pin 33, is positioned in an extended slot 35 formed in a bracket 36. The bracket 36 is mounted to the hanger 16 and/or the rotor cage 11. The slot 35 extends downwardly in a direction away from the axis A. In use, the opposite end 32 of the first link 28 and its pin 33 move along the slot 35 of the bracket 36.

The concave adjustment device can be adapted to different crops by replacing the bracket 36 with another bracket having a slot with a different angle and/or length.

The other end of the concave 14 is fixed to one or more second links 40 (three shown) provided in the form of a rod or plate. For each second link 40, a first end 42 of the second link 40 is pinned to the concave 14 by a pin 41 such that the concave 14 is capable of pivoting about the pin 41. The second link 40 is also pinned to the hanger 18 by a pin 44 such that the second link 40 is capable of pivoting about the pin 44. The second end 46 of the second link 40 is unconstrained. The pins 41 and 44 provide two pivot points for rotation of the concave 14, whereas conventional concaves may only have a single pivot point.

In summary, rock shaft 19, the first link 28, the bracket 34, the concave 14 and the second link 40 together form a linkage that is capable of moving (by way of motor 20) the concave 14 to adjust the clearance between the concave 14 and the rotor 12.

Figure 2D:
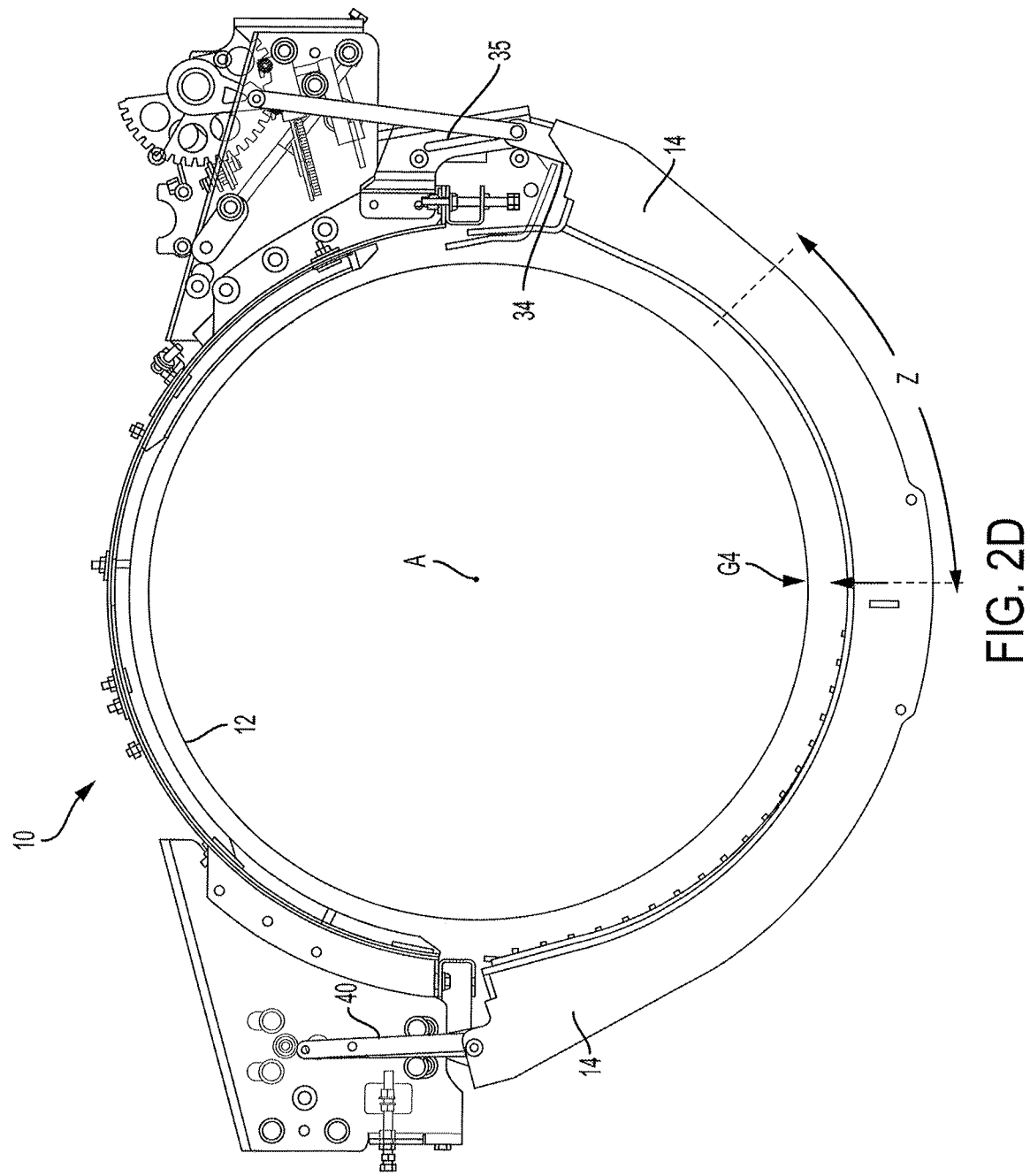

Referring now to operation of the concave adjustment device shown in FIGS. 2A-2D, the concave 14 is shown moving from a closed position in FIG. 2A to an open position of FIG. 2D. In the closed position, the pinch point G1 between the center of the upper surface of the concave 14 and the bottom of the rotor 12 is minimal. It is noted that the pinch point between the concave 14 and the rotor 12 is not constant about the circumference of the rotor 12. The pinch point is at its smallest in the fourth quadrant of a conventional coordinate plane (i.e., the bottom right quadrant as viewed in FIG. 2A).

To move the concave 14 from the closed position to the open position, the motor 20 is activated such that the output shaft of the motor 20 rotates in a first rotational direction, which rotates the worm 22, which rotates the gear 24, which rotates the rock shaft 19, and which rotates the bracket 26 in the counterclockwise direction (as viewed in FIGS. 2A-2D). It should be understood that items 22, 24, 29 and 26 move together and in unison along with the output shaft of the motor 20.

Rotation of the bracket 26 in the counterclockwise direction moves the first link 28 downward and slightly clockwise (as viewed from the front depicted in FIG. 2A). The end 32 of the first link 28, and its pin 33, slide downward along the slot 35 of the bracket 36. The bracket 34 moves downward along with the first link 28, which causes the concave 14 to move downward and rotate clockwise. At the same time, the second link 40 rotates counterclockwise about the pin 41. As the motor 20 continues to rotate, the pin 33 slides down the slot 35 and the pinch point continues to increase (compare G1-G3).

This motion is continued until the pin 33 reaches the bottom end of the slot 35 at which time the concave 12 has reached the open position of FIG. 2D. In the open position of the concave 14 shown in FIG. 2D, the pinch point G4 is significantly enlarged as compared with the pinch point G1 in the closed position shown in FIG. 2A.

Rotating the output shaft of the motor 20 in the opposite rotational direction, causes the concave 14 to move from the open position of FIG. 2D back to the closed position of FIG. 2A, and all of the aforementioned components of the concave adjustment device move in their respective opposite directions. Operation of the motor 20 can be controlled by a user of the system using a lever or button, which may be located either inside or outside of the cab of the combine.

By virtue of the above-described concave adjustment device, the pinch point gap G1-G4 between the rotor 12 and the concave 14 is substantially uniform about the inner circumference of the concave 14 for each position of the concave 14. The uniform pinch point gap produces the traditional wedge profile that is desirable in the art and described in the Background section.

According to one exemplary embodiment of the invention, the tolerance of the pinch point gap G1-G4 within the fourth quadrant is preferably 2 mm. The arc length Z of the pinch point zone in the fourth quadrant having a pinch point gap tolerance of 2 mm is maintained as large as possible. According to that exemplary embodiment, the central angle resulting in the arc length Z shown in FIGS. 2A and 2D is about 45 degrees.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A concave adjustment device for an agricultural harvester comprising:
   a rotor having a longitudinal axis;
   a concave encircling at least a portion of the rotor; and
   a linkage connected to the concave for moving the concave with respect to the rotor, wherein the linkage includes a first link having a first portion connected to means for moving the linkage and a second portion that is (i) connected to one side of the concave and (ii) guided in an elongated slot that is stationary with respect to the linkage such that the second portion of said first link and said one side of the concave travel in a direction of the elongated slot, and a second link having a first portion pivotably connected to an opposing side of the concave and a second portion pivotably connected to a fixed point on the harvester,
   wherein the means for moving is configured to translate the first link, which causes rotation of the second link and movement of the concave with respect to the rotor.

2. The concave adjustment device of claim 1, wherein the means for moving comprises a rotatable shaft having a bracket connected thereto, and wherein the first link is connected to the bracket.

3. The concave adjustment device of claim 2, wherein the means for moving further comprises a motor for rotating the rotatable shaft.

4. The concave adjustment device of claim 1, wherein the first and second links are positioned on opposite sides of the rotor.

5. The concave adjustment device of claim 1, wherein the concave is a foraminous member including a grate through which grain can pass.

6. The concave adjustment device of claim 1, wherein the stationary slot is angled with respect to a vertical axis.

7. The concave adjustment device of claim 1, wherein the stationary slot is disposed on a bracket that is removably connected to the agricultural harvester.

8. The concave adjustment device of claim 1, wherein opposing ends of the concave are not configured to pivot with respect to each other.

9. The concave adjustment device of claim 1, wherein the first and second links are both elongated and straight.

10. The concave adjustment device of claim 1, further comprising a plurality of first links each of which is connected to the concave and the means for moving, and a plurality of second links each of which is connected to the concave and a separate fixed point on the harvester.

11. The concave adjustment device of claim 1, wherein the fixed point on the harvester is a connection point on a rotor cage that at least partially encircles the rotor.

12. A concave adjustment device for an agricultural harvester comprising:
   a rotor having a longitudinal axis;
   a concave encircling at least a portion of the rotor; and
   a linkage connected to the concave for moving the concave with respect to the rotor, wherein the linkage includes:
      a first link having a first portion connected to a means for moving the linkage and a second portion that is both (i) slideably mounted in aan elongated slot that is stationary with respect to the linkage, and (ii) either directly or indirectly connected to one side of the concave, and
      a second link having a first portion pivotably connected to an opposing side of the concave and a second portion pivotably connected to a fixed point on the harvester,
   wherein the means for moving is configured to translate the first link along the slot, which causes rotation of the second link and movement of the concave with respect to the rotor.

13. The concave adjustment device of claim 12, wherein the slot is angled with respect to a vertical axis.

14. The concave adjustment device of claim 12, wherein the slot is disposed on a stationary bracket that is removably connected to the agricultural harvester.

15. The concave adjustment device of claim 12, wherein the means for moving comprises a rotatable shaft having a bracket connected thereto, and wherein the first portion of the first link is connected to the bracket.

16. The concave adjustment device of claim 15, wherein the means for moving further comprises a motor for rotating the rotatable shaft.

17. A concave adjustment device for an agricultural harvester comprising:
   a rotor having a longitudinal axis;
   a concave encircling one portion of the rotor;
   a rotor cage encircling another portion of the rotor; and
   a linkage connected to the concave for moving the concave with respect to the rotor, wherein the linkage includes:
      a rotatable shaft connected to the rotor cage;
      a first link having a first portion connected to the rotatable shaft and a second portion that is both (i) slideably mounted in an elongated slot that is stationary with respect to the linkage, and (ii) either directly or indirectly connected to one side of the concave, and
      a second link having a first portion pivotably connected to an opposing side of the concave and a second portion pivotably connected to a fixed point on the harvester,
   wherein the rotatable shaft is configured to translate the first link along the slot, which causes rotation of the second link and movement of the concave with respect to the rotor.

18. The concave adjustment device of claim 17 further comprising a motor for rotating the rotatable shaft.

19. The concave adjustment device of claim 17, wherein the concave is a foraminous member including a grate.

* * * * *